(12) United States Patent
Wong et al.

(10) Patent No.: US 7,990,871 B2
(45) Date of Patent: Aug. 2, 2011

(54) PACKET FLOOD CONTROL

(75) Inventors: Jonathan B. Wong, Alhambra, CA (US); Scott K. Nam, Granada Hills, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 95 days.

(21) Appl. No.: 12/387,401

(22) Filed: May 1, 2009

(65) Prior Publication Data

US 2010/0278044 A1 Nov. 4, 2010

(51) Int. Cl.
*H04L 12/56* (2006.01)
(52) U.S. Cl. .................... 370/235; 370/230; 370/392
(58) Field of Classification Search .................. 370/230, 370/232, 235, 236
See application file for complete search history.

(56) References Cited

U.S. PATENT DOCUMENTS

| 7,092,357 | B1* | 8/2006 | Ye ................................ 370/230 |
| 7,394,756 | B1 | 7/2008 | Cook |
| 7,673,068 | B2* | 3/2010 | Bhatia et al. ................. 709/238 |
| 2003/0012137 | A1* | 1/2003 | Abdelilah et al. ............ 370/229 |
| 2006/0133425 | A1* | 6/2006 | Kimball ........................ 370/477 |
| 2006/0171323 | A1* | 8/2006 | Qian et al. .................... 370/252 |
| 2006/0215550 | A1* | 9/2006 | Malhotra ...................... 370/229 |
| 2007/0299987 | A1* | 12/2007 | Parker et al. ................. 709/246 |
| 2008/0181102 | A1* | 7/2008 | Del Regno .................... 370/223 |
| 2009/0097490 | A1* | 4/2009 | Sanderson et al. ....... 370/395.53 |
| 2009/0161676 | A1* | 6/2009 | Breau et al. ................... 370/392 |

OTHER PUBLICATIONS

Lasserre M et al., Virtual Private LAN Service (VPLS) Using Label Distribution Protocol Signaling; rfc4762.txt IETF, Jan. 2007, XP015055051/SSN:0000-0003.

* cited by examiner

*Primary Examiner* — Ricky Ngo
*Assistant Examiner* — Rasheed Gidado
(74) *Attorney, Agent, or Firm* — Galasso & Associates, L.P.

(57) ABSTRACT

A system comprises a router having stored thereon a respective incoming label table including at least one set of LSP information (e.g., a LSP designator, a label denoting normal flow routing functionality and a label denoting controlled flow routing functionality). The router is configured for receiving a plurality of different traffic flows each including a plurality of frames, for correlating a configuration of the flow routing label of each one of the frames received thereby to a respective one of the traffic flows using information contained in the incoming label table thereof, for flooding a frame of the traffic flows of the router to all local access ports on an active VPLS domain thereof when the frame requires normal flow routing functionality, and for dropping the frame without being flooded to all of the local access ports on the active VPLS domain when the frame requires controlled flow routing functionality.

14 Claims, 9 Drawing Sheets

PACKET FLOOD CONTROL

FIELD OF THE DISCLOSURE

The disclosures made herein relate generally to providing packet flood control in a network and, more particularly, to providing packet flood control at an egress edge router within a Multi-Protocol Label Switching domain of a network.

BACKGROUND

Figure 1:
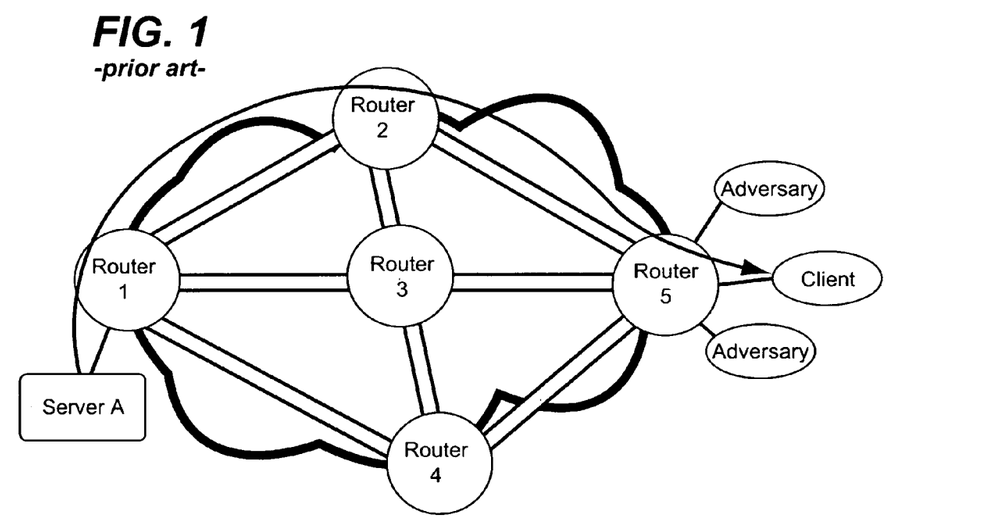
FIG. 1 shows a prior art approach for unicasting of packets from a server to a client through a network.
Figure 2:
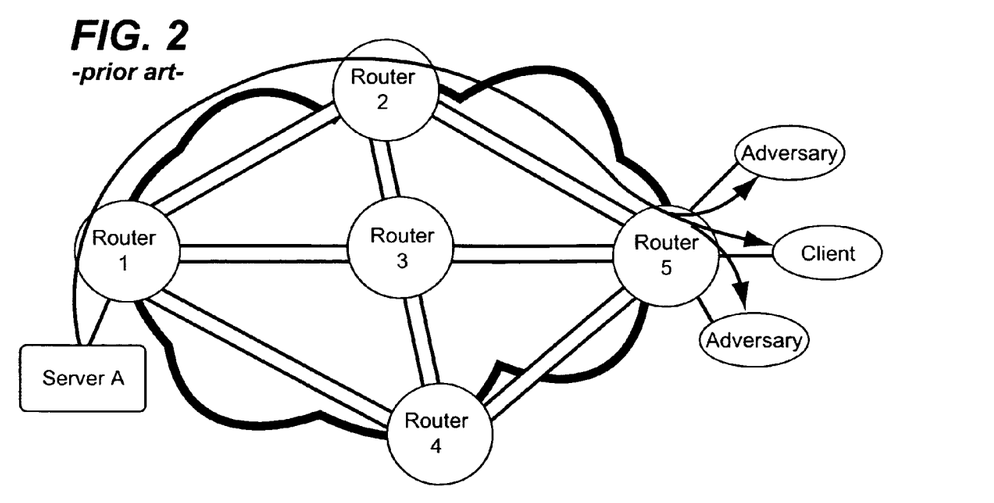
FIG. 2 shows a potentially adverse security situation that can result when a destination address of packets being transmitted from the server to the client of FIG. 1 become unknown to an egress router of the network of FIG. 1.

When a destination MAC (Media Access Control) address of a client to a Provider Edge (PE) router is known, packets sent to the PE router from a server are unicast by the PE router to the client (as shown in FIG. 1). Accordingly, such unicasting ensures that the packets are sent only to the intended client as identified by its MAC address. In contrast, by design of Multi-Protocol Label Switching (MPLS), when the destination MAC address of the client becomes unknown, packets sent to the PE router from a server are flooded out to all local access ports of the PE router that are in the same Virtual Private LAN (Local Area Network) Service (VPLS) domain as the unknown client (as shown in FIG. 2). This flooding will continue until the server application that is sending such packets stops such flooding. If any of the packets flooded out to all local access ports of the PE router contain sensitive information, this could be a potential security problem because unintended clients will receive such packets containing sensitive information.

Figure 3:
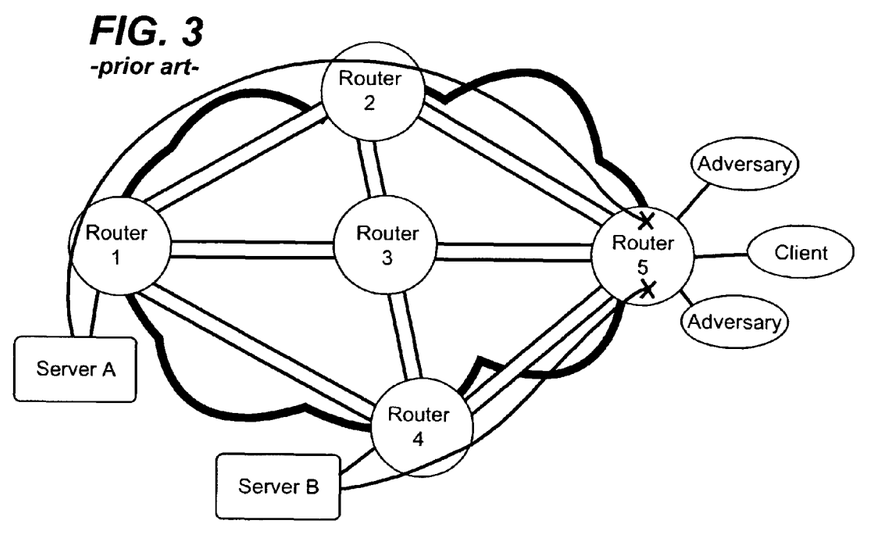
FIG. 3 shows a prior art approach for allowing packets destined for an unknown address on the egress router of the network of FIG. 1 to be dropped on a per port/virtual port basis using a CML (i.e., CPU Managed Learning) register.

In certain brands of chipset families, packet flood control can be managed through a CML (i.e., CPU Managed Learning) register. Designated settings for this register allow packets to be dropped, send to CPU, or to flood out the packets. In the event of a destination MAC address becoming unavailable (i.e., unknown destination), the most desirable CML register setting for security purposes would be to drop all packets and not to flood out packets to other access port within the same VPLS domain. Unfortunately, because this setting is applied on a per port/virtual port basis, once this option is set, all packets destined for this unknown destination client will be dropped (as shown in FIG. 3). Undesirably, this includes packets from different sources (e.g., servers) even though they contain no sensitive information and even though it would be most desirable to allow traditional flooding for such packets from other sources within VPLS Service domain so that they can discover the destination and reestablish a flow path.

SUMMARY OF THE DISCLOSURE

Embodiments of packet flood control configured in accordance with the present invention provide for packet flood control in a manner that overcomes drawbacks associated with prior art approaches for providing packet flood control. For example, performing packet flood control in accordance with embodiments of the present invention allows packets destined for an unknown address on a PE router to be dropped on a per flow basis as opposed to a per port/virtual port basis. As such, embodiments of packet flood control configured in accordance with the present invention are advantageous, desirable and useful.

In one embodiment of the present invention, a method comprises a plurality of operations. An egress router within a Multi-Protocol Label Switching (MPLS) domain performs an operation for receiving a plurality of different traffic flows. Each one of the traffic flow includes a plurality of frames each having a flow routing label and a destination address. Each one of the frames of a first one of the traffic flows and each one of the frames of a second one of the traffic flows have a common destination address. The egress router performs an operation for determining that the common destination address is unknown thereto and performs an operation for processing the flow routing label of each one of the frames. Such processing includes correlating a configuration of the flow routing label for each one of the frames to a respective one of the traffic flows. In response to such processing resulting in a determination that the flow routing label of a currently processed one of the frames corresponds to a first one of the traffic flows, the egress router performs an operation for causing the currently processed one of the frames to be dropped without flooding the currently processed one of the frames to all local access ports on an active Virtual Private LAN Service (VPLS) domain of the egress router. In response to such processing resulting in a determination that the flow routing label of a currently processed one of the frames corresponds to a second one of the traffic flows, the egress router performs an operation for causing the currently processed one of the frames to be flooded to all local access ports on the active VPLS domain of the egress router.

In another embodiment of the present invention, a network system comprises a first router having stored thereon a respective incoming label table including at least one set of Label Switching Path (LSP) information. The LSP information includes a LSP designator, a flow routing label denoting normal flow routing functionality and a flow routing label denoting controlled flow routing functionality. The first router is configured for receiving a plurality of different traffic flows each including a plurality of frames, for correlating a configuration of the flow routing label of each one of the frames received thereby to a respective one of the traffic flows using information contained in the incoming label table thereof, for flooding a frame of the traffic flows of the first router to all local access ports on an active virtual private LAN service (VPLS) domain thereof when the frame includes a flow routing label denoting normal flow routing functionality, and for dropping the frame without being flooded to all of the local access ports on the active VPLS domain when the frame includes a flow routing label denoting controlled flow routing functionality.

In another embodiment of the present invention, a router comprises an ingress processing module, an egress processing module and a transit processing module. The ingress processing module includes a traffic flow data structure and a respective outgoing label table. The traffic flow data structure includes information therein that associates at least one source address with a respective type of flow routing functionality. The outgoing label table thereof includes at least one set of Label Switch Path (LSP) information. The LSP information includes a LSP designator, a flow routing label denoting normal flow routing functionality and a flow routing label denoting controlled flow routing functionality. The ingress processing module is configured for imposing a flow routing label on each frame received thereby from the at least one source address. Such imposing is performed dependent upon information contained in the traffic flow data structure and information contained in outgoing label table thereof. The egress processing module includes a respective incoming label table including at least one set of the LSP information. The egress processing module is configured for receiving a plurality of different traffic flows each including a plurality of frames, for correlating a configuration of the flow routing label of each one of the frames received thereby to a respective one of the traffic flows using information contained in the incoming label table thereof, for flooding a frame of the traffic flows of the egress processing module to be flooded to all local access ports on an active Virtual Private LAN Service (VPLS) domain thereof when the frame includes a flow routing label denoting normal flow routing functionality, and for causing the frame to be dropped without being flooded to all of the local access ports on the active VPLS domain when the frame includes a flow routing label denoting controlled flow routing functionality. The transit processing module includes a respective incoming label table and a respective outgoing label table. The incoming and outgoing label tables of the transit processing module each include at least one set of the LSP information. The transit processing module is configured for receiving a plurality of different traffic flows each including a plurality of frames and for swapping the flow routing label of each one of the frames received thereby with a corresponding flow routing label within the outgoing label table thereof. Such swapping is performed dependent upon information contained in the inbound and outgoing label tables thereof.

As disclosed above, prior art (i.e., conventional) approaches for providing packet flood control do not offer flow level control on a per-flow basis. In contrast, embodiments of the present invention provide for flow level (i.e., per flow) flood control thereby allowing flows containing certain information (e.g., sensitive information) to be protected (i.e., not flooded to potentially adverse destination addresses). Furthermore, it is disclosed herein that packet flood control functionality in accordance with embodiments of the present invention can be used for other packet handing purposes as long as there are additional unused labels available.

These and other objects, embodiments, advantages and/or distinctions of the present invention will become readily apparent upon further review of the following specification, associated drawings and appended claims.

DETAILED DESCRIPTION OF THE DRAWING FIGURES

Multi-Protocol Label Switching (MPLS) is a packet-forwarding technology that uses labels to make data forwarding decisions. Each MPLS label is defined by a particular MPLS label value (e.g., currently MPLS label space has 20 bits with only a portion of such space for reserved labels). Accordingly, embodiments of the present invention can use MPLS labels to provide packet flood control through use of different types of flow routing functionalities. Such labels are referred to herein as flow routing labels. More specifically, through use of MPLS labels, embodiments of the present invention provide for flow level flood control such that sensitive information of a particular flow can be protected.

Figure 4:
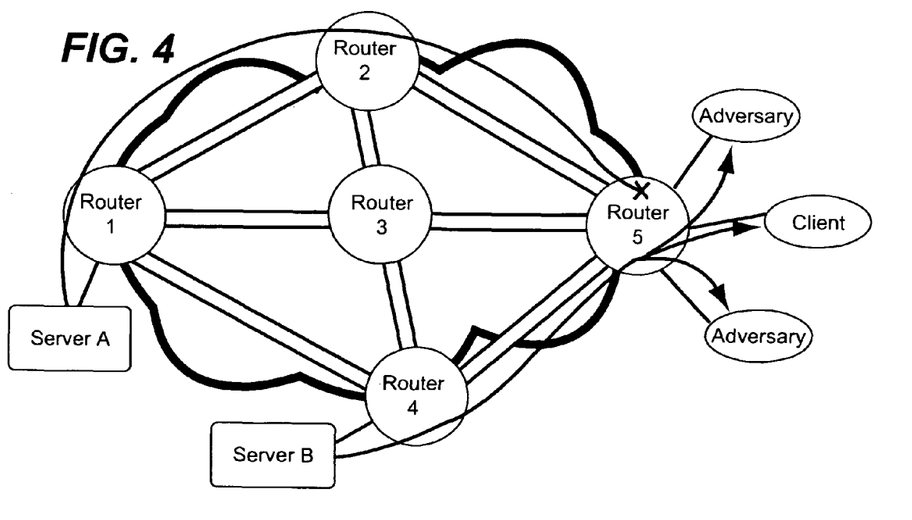
FIG. 4 shows an approach for allowing packets destined for an unknown address on the egress router of the network of FIG. 1 to be dropped on a per flow basis in accordance with an embodiment of the present invention.

FIG. 4 shows an embodiment of packet flood control in accordance with the present invention. Router 1 is connected to Server A and is functioning as an ingress Provider Edge (PE) router for traffic from the Server A. Router 5 is connected to the Client and Adversaries (i.e., adverse or potentially adverse clients with respect to the Client) and is functioning as an egress PE router for the Client and Adversaries. Routers 2-4 are connected between the ingress PE router and the egress PE router, and thus can each serve as a transit router with respect to the ingress and egress PE routers. When a destination address (e.g., destination MAC address) becomes unknown to Router 5 for traffic flow from Server A (i.e., source address MAC "A"), instead of flooding such traffic flow out to all local access ports on a current VPLS domain (i.e., that VPLS domain serving the Client and Adversaries), all packets from Server A are will be dropped, while packets from other traffic flows (e.g., Server B) to the same destination address will be flooded as normal within current VPLS domain. Such flow routing functionality of dropping packets from one source address while flooding packets from a different source address can be achieved by using unique and normal labels for packet exchange among Label Edge Routers (i.e., Routers 1, 2, 4 and 5) and Label Switch Routers (i.e., Router 3) within the MPLS domain.

Still referring to FIG. 4, when the destination MAC address of the Client becomes unknown at the egress router (i.e., Router 5), a hardware (HW) forwarding engine on the egress PE router will check a flow routing label used in incoming frames (i.e., of packets received thereby). If the flow routing labels denote that the traffic flow requires normal flow routing functionality (i.e., a normal flow routing label), the HW forwarding engine will strip off the normal flow routing labels of each frame and flood each packet as usual. If the flow routing labels denote that the traffic flow requires controlled flow routing functionality (i.e., a controlled flow routing label), the HW forwarding engine will drop the frames without performing any such flooding of corresponding packets. In this manner, packet flood control on a per-flow basis is provided.

Figure 5:
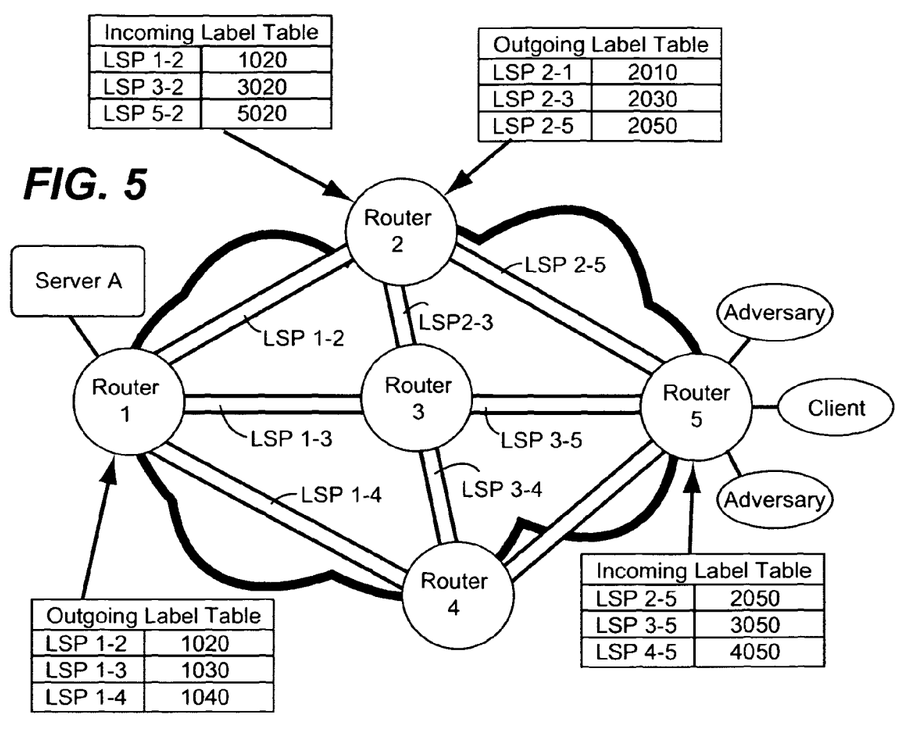
FIGS. 5-9 show an approach for carrying out packet flood control in accordance with of an embodiment of the present invention.

Referring now to FIGS. 5-9, an illustrative description of an approach for carrying out packet flood control in accordance with of an embodiment of the present invention is disclosed. As shown in FIG. 5, exchange labels between peer devices (i.e., router 1 through router 5) within the MPLS domain are setup. For example, Label Distribution Protocol (LDP) can be used for setting up such exchange labels between peer devices. LDP establishes a Label Switching Path (LSP) between such peer devices. Each LSP follows existing IP routing and is particularly well suited for establishing a full mesh of LSPs between all of the routers on a network. The result of the LSP set-up by the LDP is for each router to have an incoming label table and an outgoing label table associated therewith. Each label table includes a plurality of respective LSP designators (e.g., LSP 1-2) and a LSP label associated with each one of the LSP designators (e.g., label "1020" associated with LSP designator "LSP 1-2"). Although a current operation of a router with respect to a given traffic flow will dictate which one or ones of its label tables will be in use for supporting such traffic flow, each router will generally have an incoming label table and an outgoing label table associated therewith.

Figure 6:
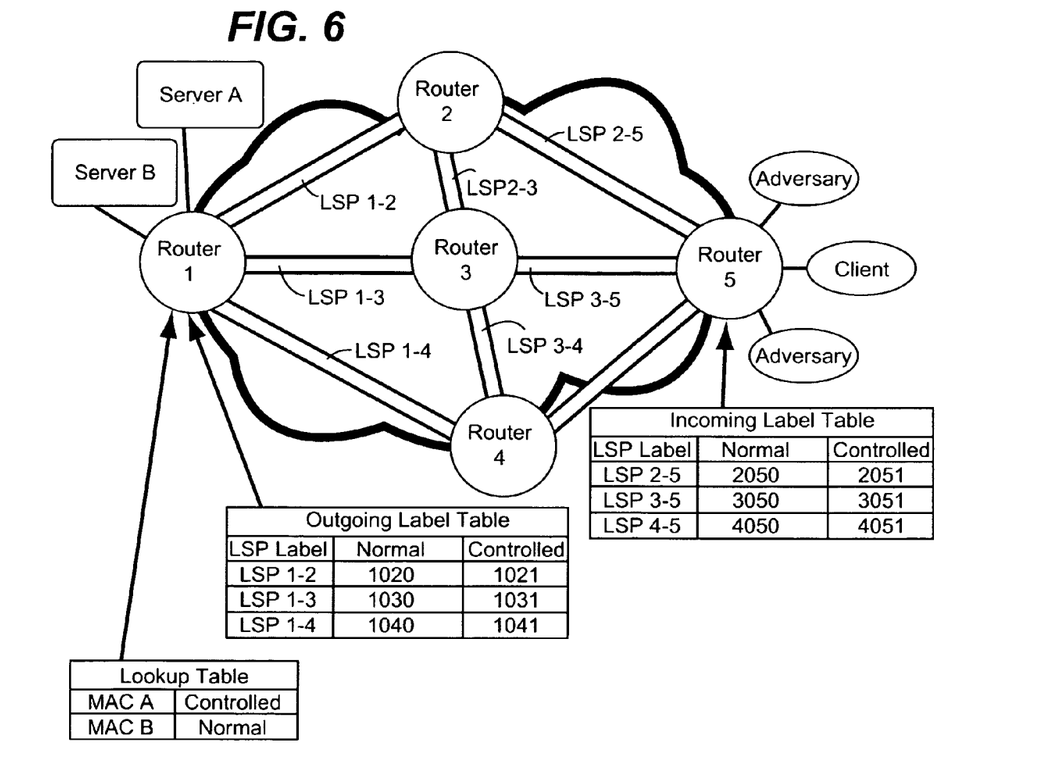

As shown in FIG. 6, after the LSPs between all of the routers are set-up, each label table is reconfigured to include sets of LSP information configured in accordance with the preset invention. More specifically, each set of LSP information includes a LSP designator (e.g., LSP 1-2), a flow routing label denoting normal flow routing functionality (e.g., label "1020" denoting normal flow routing functionality for LSP designated as "LSP 1-2") and a flow routing label denoting controlled flow routing functionality (e.g., label "1021" denoting controlled flow routing functionality for LSP designated as "LSP 1-2"). Accordingly, a flow routing label denoting normal flow routing functionality is referred to herein as a normal flow routing label and a flow routing label denoting controlled flow routing functionality is referred to herein as a controlled flow routing label.

Still referring to FIG. 6, in addition to each label table being reconfigured to include sets of LSP information, the ingress PE router (i.e., Router 1) is configured with a routing functionality look-up table (i.e., a traffic flow data structure). The routing functionality look-up table has information therein that associates at least one source address with a respective type of flow routing functionality. Server A having source address (i.e., MAC address) of "MAC A" is connected to the ingress PE router. Once configured with the routing functionality look-up table, any frames received by the ingress PE router from Server A will be imposed with a flow routing label denoting controlled flow routing functionality. To this end, a HW element of the ingress PE router can create the routing functionality lookup table indicating that any incoming packets with a source address of "MAC A" will use the controlled flow routing label instead of the normal controlled flow routing label as setup by the LDP. The LDP will reconfigure each label table of each router in the MPLS network (i.e., Routers 2 through Router 5) to include a controlled flow routing label and a normal flow routing label for each LSP designator. However, in some embodiments, the routing functionality look-up table can be provided only on the ingress PE router.

Figure 7:
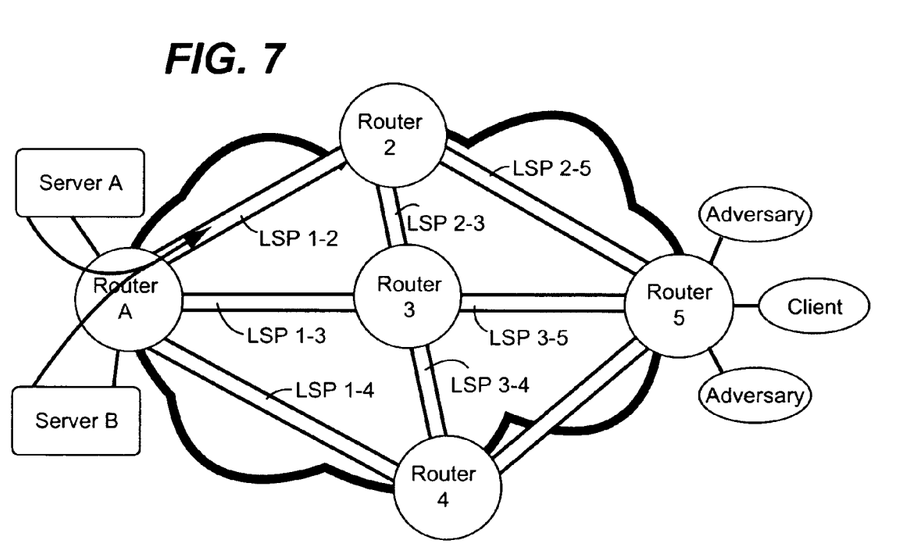

As shown in FIG. 7, the Client initiates a connection to Server A and to Server B. Server B has a source address of "MAC B". Router 1 serves as the ingress PE router for Server A and Server B. As designated in the routing functionality look-up table, Server A is a controlled flow traffic source and Server B is a normal flow traffic source. For example, traffic from Server A can include sensitive information that must not be flooded out to the Adversaries of the Client. In response to receiving packets from Server A and Server B, the HW forwarding engine of the Ingress PE router checks the routing functionality look-up table to determine what type of flow routing label should be imposed on the frames of the packets received from Server A and Server B. Accordingly, each frame received from Server A is imposed with a controlled flow routing label corresponding to the LSP on which the packets from Server A will be forwarded (i.e., controlled flow routing label of 1021) and each frame received from Server B is imposed with a normal flow routing label corresponding to the LSP on which the packets from Server B will be forwarded (i.e., normal flow routing label of 1020). After a frame has a respective flow routing label imposed thereon, the HW forwarding engine forwards the corresponding packet out to an appropriate LSP (i.e., in the embodiment, packets from Server A and Server B are forwarded out on LSP 1-2).

Figure 8:
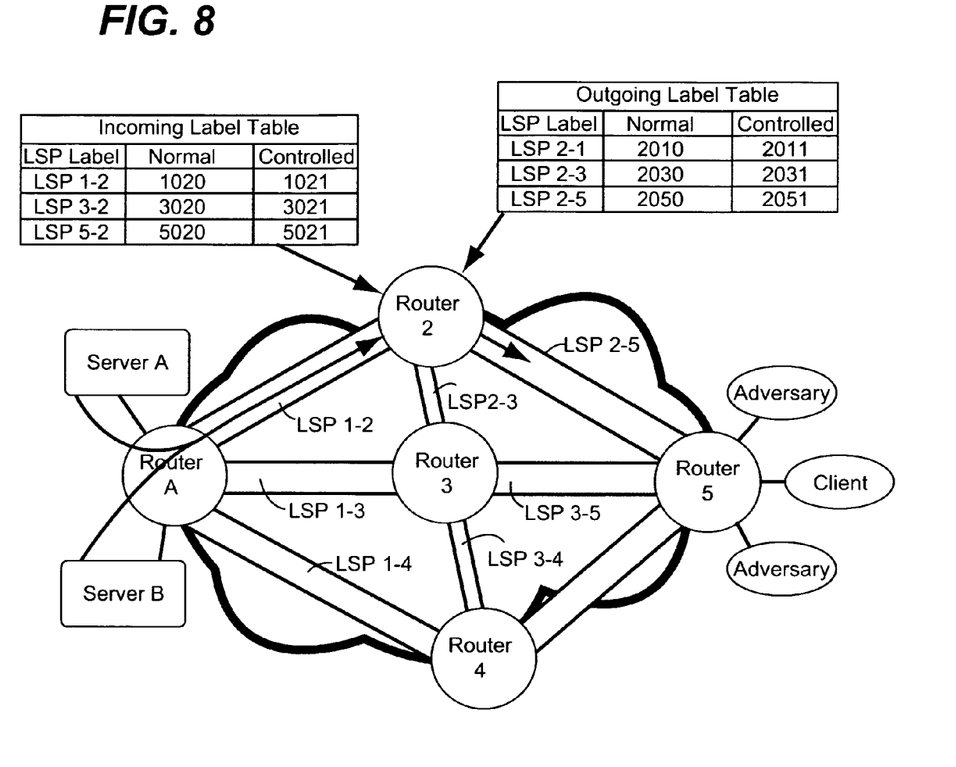

Referring to FIG. 8, after being forwarded from the egress PE router, the packets from Server A and Server B are ingress by Router 2 (i.e., the LSR) and a HW forwarding engine of the LSR swaps MPLS labels of the frames thereof as usual (i.e., in accordance with standard MPLS protocol). However, before performing such swapping, the HW forwarding engine of the LSR checks the flow routing label of each incoming frame against the LSP information maintained in the incoming label table thereof and correlates the type of flow routing label to a corresponding type of flow routing label in the outgoing label table of the LSR for the LSP on which the corresponding packet will be forwarded. Specifically, if the label is a normal flow routing label, the label of the incoming frame is swapped with a normal flow routing label corresponding to the LSP on which the corresponding packet will be forwarded (i.e., normal flow routing label of 2050), and if the label is a controlled flow routing label, the label of the incoming frame is swapped with a controlled flow routing label corresponding to the LSP on which the corresponding packet will be forwarded (i.e., controlled flow routing label of 2051).

When packets originally sent by Servers A and B designate a destination address corresponding to the Client, a HW forwarding engine of the egress router pops all labels from the frames of the packets after the packets ingress at the egress PE router. The destination address of the Client is learned and stored in the Layer 2 (L2) table of the egress PE router after the labels are popped. Thereafter, the HW forwarding engine of the egress PE router will checks if the destination address of each packets is known to the L2 table. When the destination address is known to the egress PE router, each packet is then forwarded via unicasting to the client destination address. These operations remain the same for packets originating at Server A and Server B so long as the destination address of the Client remains known to the egress PE router.

Figure 9:
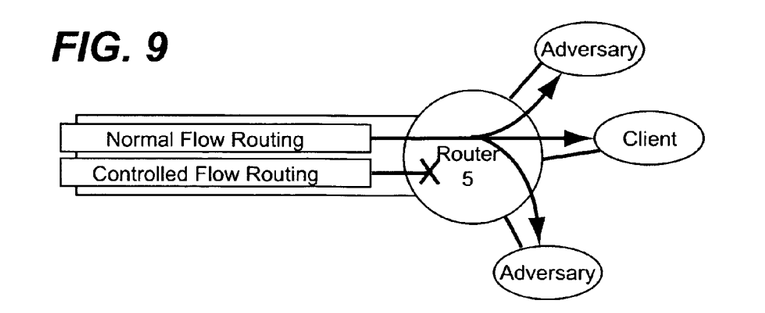

Referring to FIG. 9, the egress PE router can jointly perform normal flow routing functionality and controlled flow routing functionality when the destination address of the Client is removed from egress PE (i.e., becomes unknown to the egress PE router) due to reasons such as, for example, link down, port down, or even by user explicit flush command. With respect to normal flow routing functionality, packets having frames with the normal flow routing label (e.g., those from Server B) will be flooded to all local access ports within the active VPLS domain when the destination address becomes unknown. With respect to controlled flow routing functionality, packets having frames with the controlled flow routing label (e.g., those from Server A) will be dropped without being flooded out to all local access ports within the active VPLS domain when the destination address becomes unknown. Accordingly, through such normal flow routing functionality and controlled flow routing functionality, embodiments of the present invention advantageously allow for packets to be dropped on a per flow basis as opposed to a per port/virtual port basis.

Figure 10:
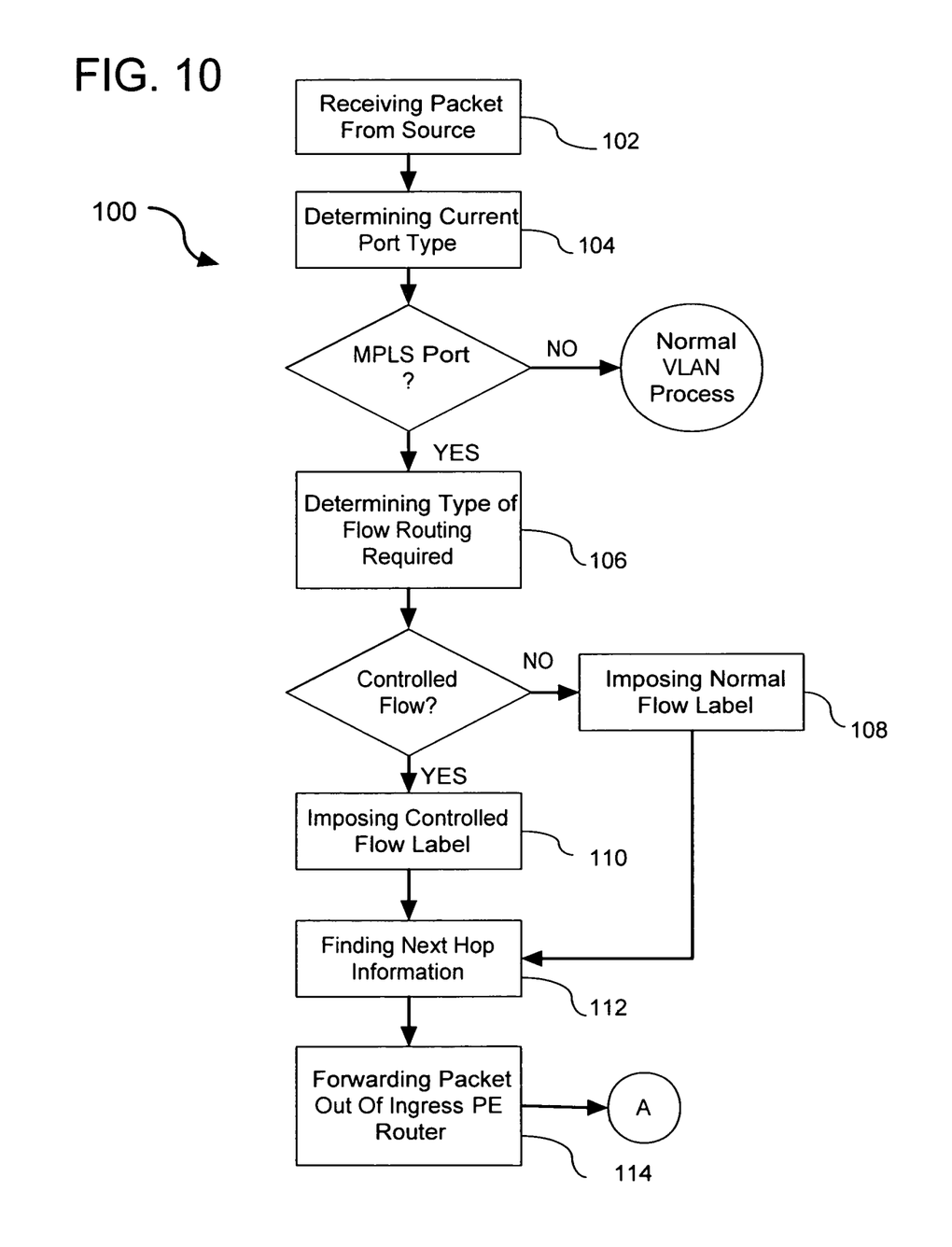
FIGS. 10-12 show a method for providing packet flood control in accordance with an embodiment of the present invention.
Figure 11:
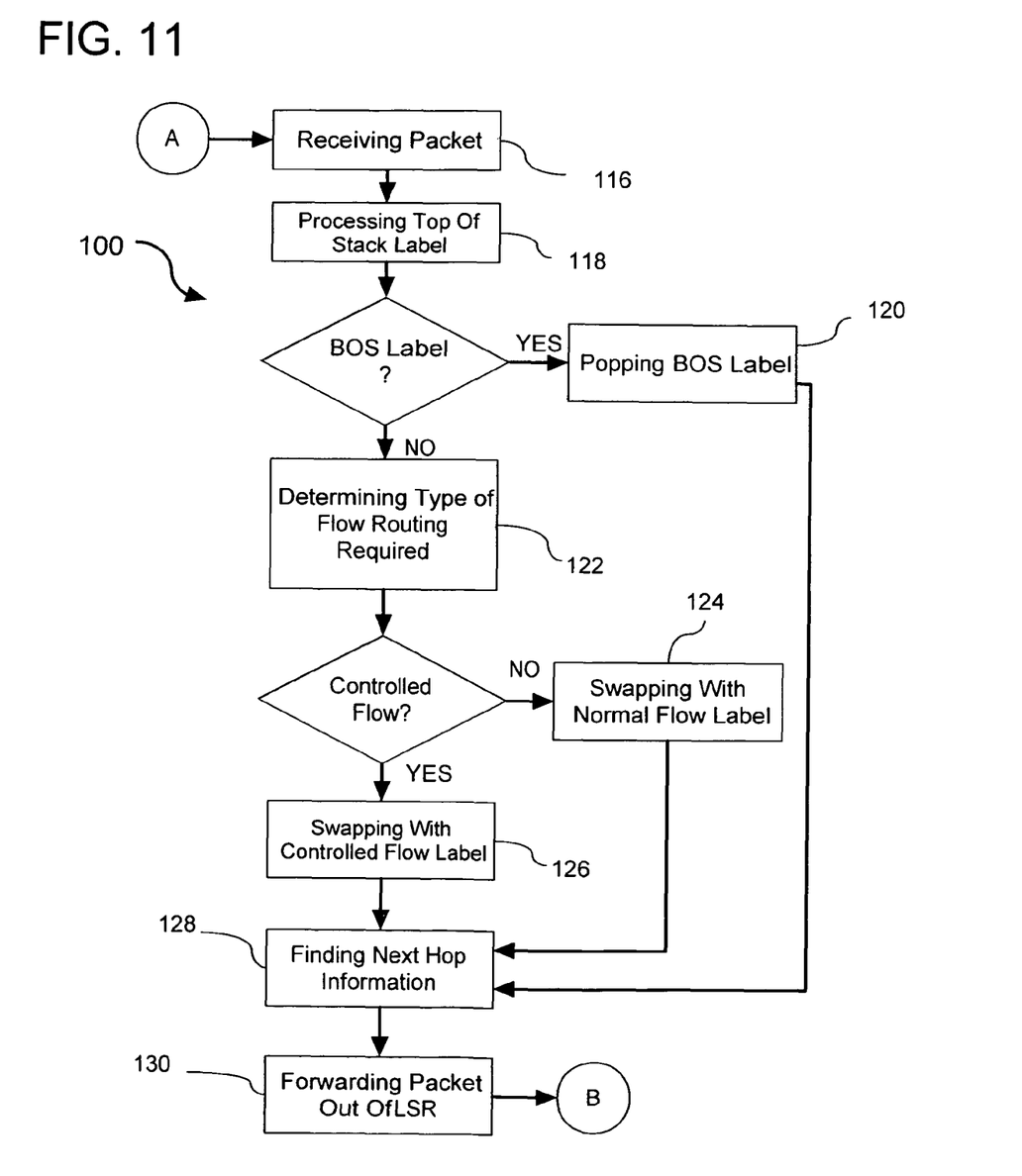
Figure 12:
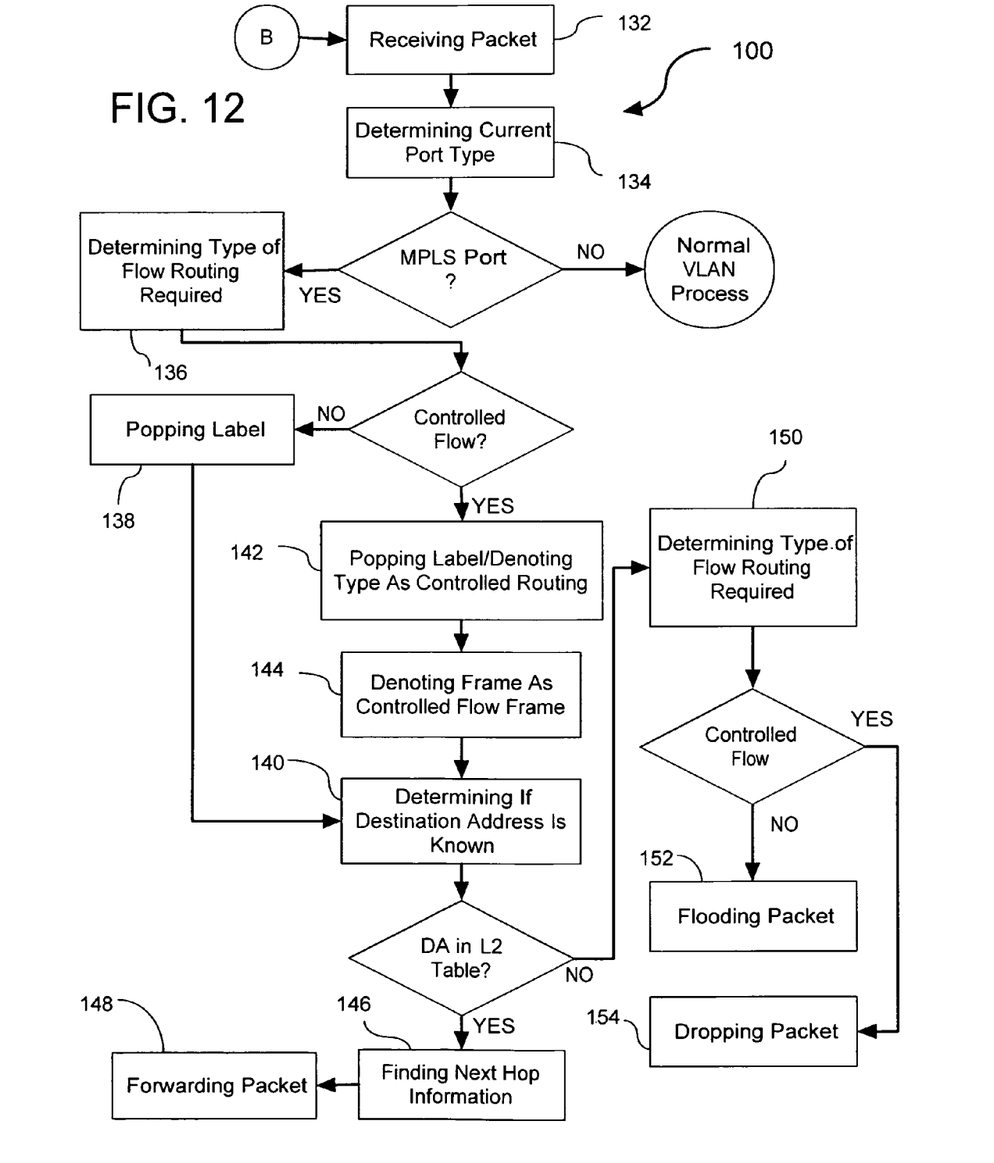

Referring now to FIGS. 10-12, a method 100 for providing packet flood control in accordance with an embodiment of the present invention is shown. The method 100 relies upon the use MPLS labels to provide packet flood control through use of different types of flow routing functionalities. The different flow routing functionalities provide for packet flood control to be provided on a per-flow basis as opposed to a per port/virtual port basis. In this manner, through use of MPLS labels, the method 100 provides for flow level flood control such that sensitive information of a particular flow can be protected by not flooding it out to all local access ports within an active VPLS domain when a destination address of the particular traffic flow and other non-sensitive traffic flows become unknown to an egress router comprising the local access ports.

After an ingress router performs an operation 102 for receiving a packet from a source (e.g., a server), the ingress server performs an operation 104 for determining a current port type for a port on which the packet was received. In response to the port being a type other than a MPLS port, a normal VLAN process method proceeds for the packet. Otherwise, the port is an MPLS port and the ingress router performs an operation 106 for determining a type of flow routing functionality that the packet requires. In one embodiment, such determination is made by checking a lookup table that correlates a source address to a type of flow routing functionality. When the determination is made that the packet requires normal flow routing functionality, the ingress router performs an operation 108 for imposing a normal flow routing label on each one of the frames of the packet. When the determination is made that the packet requires controlled flow routing functionality, the ingress router performs an operation 110 for imposing a controlled flow routing label on each one of the frames. Thereafter, the ingress router performs an operation 112 for finding next hop information for the packet and performs an operation 114 for forwarding the packet according to such next hop information.

After the packet is forwarded by the ingress router, a transit router (e.g., a label switching router (LSR)) performs an operation 116 for receiving the packet. The transit router then performs an operation 118 for processing a top of stack (TOS) label of each frame of the packet. When such processing results in a determination that the top of stack label is the last label in the label stack (i.e., it is the bottom of stack (BOS) label), the transit router performs an operation 120 for popping the BOS label. Otherwise, the transit router performs an operation 122 for determining a type of flow routing functionality that the packet requires. In one embodiment, such determination is made by checking the flow routing label against flow routing labels in an incoming label table. When the determination is made that the packet requires normal flow routing functionality, the transit router performs an operation 124 for swapping the flow routing label of each frame with a corresponding normal flow routing label maintained in an outgoing label table of the transit router. When the determination is made that the packet requires controlled flow routing functionality, the transit router performs an operation 126 for swapping the flow routing label of each frame with a corresponding controlled flow routing label maintained in the outgoing label table of the transit router. Thereafter, the transit router performs an operation 128 for finding next hop information for the packet and performs an operation 130 for forwarding the packet according to such next hop information.

After the packet is forwarded by the transit router, an egress router performs an operation 132 for receiving the packet. After the egress router receives the packet, the egress router performs an operation 134 for determining a current port type for a port on which the packet was received. In response to the port being a type other than a MPLS port, a normal VLAN process method proceeds for the packet. Otherwise, the port is an MPLS port and the egress router performs an operation 136 for determining a type of flow routing functionality that the packet requires. In one embodiment, such determination is made by checking the flow routing label against flow routing labels in an incoming label table of the egress router. When the determination is made that the packet requires normal flow routing functionality (i.e., frames thereof include normal flow routing label), the egress router performs an operation 138 for popping the frame and performing an operation 140 for determining if a destination address of the packet is within a L2 table of the egress router. When the determination is made that the packet requires controlled flow routing functionality (i.e., frames thereof include a controlled flow routing label), the egress router performs an operation 142 for popping the label and performs an operation 144 for denoting the packet as requiring controlled flow routing functionality. After the packet is denoted as requiring controlled flow routing functionality, the method proceeds at the operation 140 for determining if the destination address of the packet is within the L2 table of the egress router.

If the destination address of the packet is within the L2 table of the egress router (i.e., is known to the egress router), the egress router performs an operation 146 for finding next hop information for the packet and performs an operation 148 for forwarding (e.g., unicasting) the packet according to such next hop information. If the destination address of the packet is not within the L2 table of the egress router, the egress router performs an operation 150 for determining a type of flow routing functionality that the packet requires. When the determination is made that the packet requires normal flow routing functionality (i.e., frames thereof include normal flow routing label), the egress router performs an operation 152 for flooding the packet to all local access ports within an active VPLS domain of the egress router. When the determination is made that the packet requires controlled flow routing functionality (i.e., frames thereof include controlled flow routing label), the egress router performs an operation 154 for dropping the packet without flooding it to all local access ports within the active VPLS domain of the egress router.

Turning now to a discussion on router architecture, a skilled person will appreciate that, in a network of routers having a distributed architecture, discrete processing modules of a single router can each perform a respective type of routing functionality (e.g., ingress routing functionality, egress routing functionality and transit routing functionality). Accordingly, it is disclosed herein that a router configured in accordance with an embodiment of the present invention can include an ingress processing module, an egress processing module and a transit processing module. The ingress processing module includes a traffic flow data structure and a respective outgoing label table. The traffic flow data structure includes information therein that associates at least one source address with a respective type of flow routing functionality. The outgoing label table thereof includes at least one set of Label Switch Path (LSP) information. The LSP information includes a LSP designator, a flow routing label denoting normal flow routing functionality and a flow routing label denoting controlled flow routing functionality. The ingress processing module is configured for imposing a flow routing label on each frame received thereby from the at least one source address. Such imposing is performed dependent upon information contained in the traffic flow data structure and information contained in outgoing label table thereof. The egress processing module includes a respective incoming label table including at least one set of the LSP information. The egress processing module is configured for receiving a plurality of different traffic flows each including a plurality of frames, for correlating a configuration of the flow routing label of each one of the frames received thereby to a respective one of the traffic flows using information contained in the incoming label table thereof, for flooding a frame of the traffic flows of the egress processing module to be flooded to all local access ports on an active Virtual Private LAN Service (VPLS) domain thereof when the frame includes a flow routing label denoting normal flow routing functionality, and for causing the frame to be dropped without being flooded to all of the local access ports on the active VPLS domain when the frame includes a flow routing label denoting controlled flow routing functionality. The transit processing module includes a respective incoming label table and a respective outgoing label table. The incoming and outgoing label tables of the transit processing module each include at least one set of the LSP information. The transit processing module is configured for receiving a plurality of different traffic flows each including a plurality of frames and for swapping the flow routing label of each one of the frames received thereby with a corresponding flow routing label within the outgoing label table thereof. Such swapping is performed dependent upon information contained in the inbound and outgoing label tables thereof.

It is also disclosed herein that a router configured in accordance with the present invention can include an ingress traffic interface, an egress traffic interface, memory, and one or more data processing devices (for example, processors ASICs, and/or the like). In one specific embodiment, each one of a plurality of processing modules includes a respective one of the data processing devices. The ingress traffic interface is configured for being coupled to a network node (e.g., another router or a server) that forwards protocol data units (PDUs) such as, for example, packets to the router. The egress traffic interface is configured for being coupled to a network node that receives protocol data units (PDUs) such as, for example, packets to the router. The memory has instructions stored thereon and accessible therefrom. The one or more processors are configured for accessing and interpreting the instructions thereby performing functionality defined by such instructions. The one or more processors are coupled to the interfaces for enabling communication between the one or more processors and network nodes connected to the interfaces. In one embodiment, the instructions are configured for carrying out the method 100 discussed above such that for a given packet, the router performs a respective aspect of packet flood control as disclosed herein.

Referring now to instructions processible by a data processing device, it will be understood from the disclosures made herein that methods, processes and/or operations adapted for carrying out packet flood control as disclosed herein are tangibly embodied by computer readable medium having instructions thereon that are configured for carrying out such functionality. In one specific embodiment, the instructions are tangibly embodied for carrying out all or a portion of the method 100 and/or the functionality depicted in FIGS. 5-9. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out packet flood control functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:

an egress router within a Multi-Protocol Label Switching (MPLS) domain receiving a plurality of different traffic flows, wherein each one of said traffic flow includes a plurality of frames each having a flow routing label and a destination address, wherein each one of said frames of a first one of said traffic flows and each one of said frames of a second one of said traffic flows have a common destination address;

the egress router determining that the common destination address is unknown thereto;

an egress router processing the flow routing label of each one of said frames, wherein said processing includes correlating a configuration of the flow routing label for each one of said frames to a respective one of said traffic flows;

in response to said processing resulting in a determination that the flow routing label of a currently processed one of said frames corresponds to a first one of said traffic flows, the egress router causing the currently processed one of said frames to be dropped without flooding the currently processed one of said frames to all local access ports on an active Virtual Private LAN Service (VPLS) domain of the egress router;

in response to said processing resulting in a determination that the flow routing label of a currently processed one of said frames corresponds to a second one of said traffic flows, the egress router causing the currently processed one of said frames to be flooded to all local access ports on the active VPLS domain of the egress router;

the ingress router within the MPLS domain imposing the flow routing label on each one of said frame of the first one of said traffic flows prior to forwarding each one of said frames of the first one of said traffic flows toward the egress router;

the ingress router maintaining a traffic flow data structure having information therein that associates a first source address with a type of flow routing required for frames designating the first source address, wherein said imposing includes determining that a frame received thereby designates the first source address and checking the traffic flow data structure to identify a type of flow routing that corresponds to the first source address; and the ingress router and the egress router each maintaining a respective label table;

wherein each label table includes at least one set of Label Switch Path (LSP) information;

wherein said LSP information includes a LSP designator, a flow routing label denoting normal flow routing functionality and a flow routing label denoting controlled flow routing functionality;

wherein said normal flow routing functionality includes causing frames to be flooded to all local access ports on an active VPLS domain; and wherein said controlled flow routing functionality includes causing frames to be dropped without being flooded to all local access ports on an active VPLS domain.

2. The method of claim 1, further comprising:

a transit router coupled between the ingress router and the egress router;

wherein the transit router maintains an incoming label table and an outgoing label table; and wherein the incoming label table and the outgoing label table each include at least one set of LSP information.

3. The method of claim 2, further comprising:
the transit router receiving and forwarding frames of at least the first one of said traffic flows, wherein said forwarding includes checking the flow routing label of each incoming frame against LSP information of the incoming label table thereof;
in response to said checking resulting in a determination that the flow routing label of an incoming frame is a flow routing label denoting normal flow routing functionality, the transit router swapping the flow routing label of the incoming frame with a corresponding normal flow routing label maintained in the outgoing label table thereof; and
in response to said checking resulting in a determination that the flow routing label of an incoming frame is a flow routing label denoting controlled flow routing functionality, the transit router swapping the flow routing label of the incoming frame with a corresponding controlled flow routing label maintained in the outgoing label table thereof.

4. A method, comprising:
an egress router within a Multi-Protocol Label Switching (MPLS) domain receiving a plurality of different traffic flows, wherein each one of said traffic flow includes a plurality of frames each having a flow routing label and a destination address, wherein each one of said frames of a first one of said traffic flows and each one of said frames of a second one of said traffic flows have a common destination address;
the egress router determining that the common destination address is unknown thereto;
the egress router processing the flow routine label of each one of said frames, wherein said processing includes correlating a configuration of the flow routing label for each one of said frames to a respective one of said traffic flows;
in response to said processing resulting in a determination that the flow routing label of a currently processed one of said frames corresponds to a first one of said traffic flows, the egress router causing the currently processed one of said frames to be dropped without flooding the currently processed one of said frames to all local access ports on an active Virtual Private LAN Service (VPLS) domain of the egress router;
in response to said processing resulting in a determination that the flow routing label of a currently processed one of said frames corresponds to a second one of said traffic flows, the egress router causing the currently processed one of said frames to be flooded to all local access ports on the active VPLS domain of the egress router; and
each router within the MPLS domain maintaining a respective label table;
wherein each label table includes at least one set of label switch path (LSP) information;
wherein said LSP information includes a LSP designator, a flow routing label denoting normal flow routing functionality and a flow routing label denoting controlled flow routing functionality;
wherein said normal flow routing functionality includes causing frames to be flooded to all local access ports on an active VPLS domain; and
wherein said controlled flow routing functionality includes causing frames to be dropped without being flooded to all local access ports on an active VPLS domain.

5. The method of claim 4, further comprising:
a transit router coupled between an ingress router and the egress router;
wherein the transit router maintains an incoming label table and an outgoing label table; and
wherein the incoming label table and the outgoing label table each include at least one set of LSP information.

6. The method of claim 5, further comprising:
the transit router receiving and forwarding frames of at least the first one of said traffic flows, wherein said forwarding includes checking the flow routing label of each incoming frame against LSP information of the incoming label table thereof;
in response to said checking resulting in a determination that the flow routing label of an incoming frame is a flow routing label denoting normal flow routing functionality, the transit router swapping the flow routing label of the incoming frame with a corresponding normal flow routing label maintained in the outgoing label table thereof; and
in response to said checking resulting in a determination that the flow routing label of an incoming frame is a flow routing label denoting controlled flow routing functionality, the transit router swapping the flow routing label of the incoming frame with a corresponding controlled flow routing label maintained in the outgoing label table thereof.

7. A network system, comprising:
a first router having stored thereon a respective incoming label table including at least one set of Label Switching Path (LSP) information, wherein said LSP information includes a LSP designator, a flow routing label denoting normal flow routing functionality and a flow routing label denoting controlled flow routing functionality, wherein the first router is configured for receiving a plurality of different traffic flows each including a plurality of frames, for correlating a configuration of the flow routing label of each one of said frames received thereby to a respective one of said traffic flows using information contained in the incoming label table thereof, for flooding a frame of said traffic flows of the first router to all local access ports on an active virtual private LAN service (VPLS) domain thereof when the frame includes a flow routing label denoting normal flow routing functionality, and for dropping the frame without being flooded to all of said local access ports on the active VPLS domain when the frame includes a flow routing label denoting controlled flow routing functionality;
a second router having stored thereon a traffic flow data structure having information therein that associates at least one source address with a respective type of flow routing functionality and having stored thereon a respective outgoing label table including at least one set of said LSP information, wherein the second router is configured for imposing a flow routing label on each frame received thereby from said at least one source address and wherein said imposing is performed dependent upon information contained in the traffic flow data structure and information contained in outgoing label table thereof;
wherein the traffic flow data structure associates each source address for traffic flow received by the second router with either said normal flow routing functionality or said controlled flow routing functionality;
wherein the first router is configured for causing said dropping in response to determining that a destination address of the frame has become unknown thereto;

wherein each one of said label tables associates a first LSP designator with a first flow routing label denoting normal flow routing functionality and a first flow routing label denoting controlled flow routing functionality; and wherein each one of said label tables associates a second LSP designator with a second flow routing label denoting normal flow routing functionality and a second flow routing label denoting controlled flow routing functionality.

8. The system of claim 7 wherein the first router is configured for causing said dropping in response to determining that a destination address of the frame has become unknown thereto.

9. The system of claim 7, further comprising:
a third router coupled between the first router and the second router, wherein the third router includes a respective incoming label table and a respective outgoing label table and wherein said incoming and outgoing label tables each include at least one set of said LSP information, wherein the third router is configured for receiving a plurality of different traffic flows each including a plurality of frames and for swapping the flow routing label of each one of said frames received thereby with a corresponding flow routing label within the outgoing label table thereof, and wherein said swapping is performed dependent upon information contained in said inbound and outgoing label tables thereof.

10. A network system, comprising:
a first router having stored thereon a respective incoming label table including at least one set of Label Switching Path (LSP) information, wherein said LSP information includes a LSP designator, a flow routing label denoting normal flow routing functionality and a flow routing label denoting controlled flow routing functionality, wherein the first router is configured for receiving a plurality of different traffic flows each including a plurality of frames, for correlating a configuration of the flow routing label of each one of said frames received thereby to a respective one of said traffic flows using information contained in the incoming label table thereof, for flooding a frame of said traffic flows of the first router to all local access ports on an active virtual private LAN service (VPLS) domain thereof when the frame includes a flow routing label denoting normal flow routing functionality, and for dropping the frame without being flooded to all of said local access ports on the active VPLS domain when the frame includes a flow routing label denoting controlled flow routing functionality;

a second router having stored thereon a traffic flow data structure having information therein that associates at least one source address with a respective type of flow routing functionality and having stored thereon a respective outgoing label table including at least one set of said LSP information, wherein the second router is configured for imposing a flow routing label on each frame received thereby from said at least one source address and wherein said imposing is performed dependent upon information contained in the traffic flow data structure and information contained in outgoing label table thereof; and a third router coupled between the first router and the second router, wherein the third router includes a respective incoming label table and a respective outgoing label table and wherein said incoming and outgoing label tables each include at least one set of said LSP information, wherein the third router is configured for receiving a plurality of different traffic flows each including a plurality of frames and for swapping the flow routing label of each one of said frames received thereby with a corresponding flow routing label within the outgoing label table thereof, and wherein said swapping is performed dependent upon information contained in said inbound and outgoing label tables thereof.

11. The system of claim 10 wherein the first router is configured for causing said dropping in response to determining that a destination address of the frame has become unknown thereto.

12. A router, comprising:
an ingress processing module including a traffic flow data structure and a respective outgoing label table, wherein the traffic flow data structure includes information therein that associates at least one source address with a respective type of flow routing functionality and wherein the outgoing label table thereof includes at least one set of Label Switch Path (LSP) information, wherein said LSP information includes a LSP designator, a flow routing label denoting normal flow routing functionality and a flow routing label denoting controlled flow routing functionality, wherein the ingress processing module is configured for imposing a flow routing label on each frame received thereby from said at least one source address and wherein said imposing is performed dependent upon information contained in the traffic flow data structure and information contained in outgoing label table thereof;

an egress processing module including a respective incoming label table, wherein the incoming label table thereof includes at least one set of said LSP information, wherein the egress processing module is configured for receiving a plurality of different traffic flows each including a plurality of frames, for correlating a configuration of the flow routing label of each one of said frames received thereby to a respective one of said traffic flows using information contained in the incoming label table thereof, for flooding a frame of said traffic flows of the egress processing module to be flooded to all local access ports on an active Virtual Private LAN Service (VPLS) domain thereof when the frame includes a flow routing label denoting normal flow routing functionality, and for causing the frame to be dropped without being flooded to all of said local access ports on the active VPLS domain when the frame includes a flow routing label denoting controlled flow routing functionality; and a transit processing module including a respective incoming label table and a respective outgoing label table, wherein said incoming and outgoing label tables each include at least one set of said LSP information, wherein the transit processing module is configured for receiving a plurality of different traffic flows each including a plurality of frames and for swapping the flow routing label of each one of said frames received thereby with a corresponding flow routing label within the outgoing label table thereof, and wherein said swapping is performed dependent upon information contained in said inbound and outgoing label tables thereof;

wherein each one of said label tables associates a first LSP designator with a first flow routing label denoting normal flow routing functionality and a first flow routing label denoting controlled flow routing functionality; and wherein each one of said label tables associates a second LSP designator with a second flow routing label denoting normal flow routing functionality and a second flow routing label denoting controlled flow routing functionality.

13. The router of claim 12 wherein the traffic flow data structure associates each source address for traffic flow received by the second router with either said normal flow routing functionality or said controlled flow routing functionality.

14. The router of claim 12 wherein the egress processing module is configured for causes said dropping in response to determining that a destination address of the frame has become unknown thereto.

* * * * *